United States Patent [19]
Cullis

[11] 3,807,561
[45] Apr. 30, 1974

[54] AUTOMATIC VALVES, PARTICULARLY FOR USE WITH FILTERS

[75] Inventor: John Crawford Cullis, Abergavenny, Wales

[73] Assignee: Engineering Components Limited, Liverpool, Buckinghamshire, England

[22] Filed: Sept. 13, 1971

[21] Appl. No.: 179,998

[52] U.S. Cl............... 210/130, 137/525.1, 210/440
[51] Int. Cl............................................ B01d 27/10
[58] Field of Search............ 137/525.1; 210/DIG. 17, 210/130, 136, 440, 441, 443, 444

[56] References Cited
UNITED STATES PATENTS

| | | | |
|---|---|---|---|
| 3,599,792 | 8/1971 | Stripp | 210/130 |
| 3,589,517 | 6/1971 | Palmal | 210/130 |
| 3,193,101 | 7/1965 | Humbert, Jr. | 210/130 |

*Primary Examiner*—Samih N. Zaharna
*Assistant Examiner*—T. A. Granger
*Attorney, Agent, or Firm*—Cushman, Darby & Cushman

[57] ABSTRACT

An automatic valve of the poppet or mushroom type is described. It is moulded as an integral unit from glass fibre reinforced nylon and has a head and a stem consisting of two parallel limbs formed at their free ends with lateral hook-like projections. The limbs can be pressed together to enable the projections to pass through a port in a ported member and then allowed to spring back to their normal configuration in which they engage a spring interposed between the projections and ported member.

4 Claims, 6 Drawing Figures

AUTOMATIC VALVES, PARTICULARLY FOR USE WITH FILTERS

This invention relates to automatic valves of the poppet or mushroom type. Such valves have a head which, when the valve is closed, bears on a port or aperture, and a stem that passes through this port and is loaded by a spring, mounted on the side of the port remote from the valve head, for biasing the valve to the closed position.

Although this form of valve is very simple, its design and mounting has involved some difficulty in some situations in that the valve has had to be made in two or more parts fitted together, or a cage has had to be provided for the spring.

The primary object of the present invention is to provide an automatic valve of the aforesaid type which is in one piece, is simple to manufacture and easy to fit.

According to the invention, an automatic valve of the poppet type is formed in one piece with a head providing a peripheral flange at one end of a stem having lateral projections at the other end to serve as abutments for a spring which, when the valve is in use, is interposed between the abutments and one side of a ported member, while the head is positioned so as to overlap the port on the other side for controlling the flow of fluid through the port, the stem being resiliently deformable so as to permit the abutments to be passed through the port to the positions in which they receive the spring. Advantageously the stem may comprise a number of spaced, parallel limbs, each with a hook-like abutment which engages one end of a helical compression spring interposed between the limbs and the member in which the port is formed. To enable the abutments to be passed through the port, the limbs are pressed towards one another and then allowed to spring back to their normal configuration. There are preferably two parallel limbs extending from a shallow circular ring formed on the head by which the valve when closed, is centred with respect to the head.

Most conveniently, the valve may be moulded to shape from a plastics material. Glass fibre reinforced nylon has been found to be a satisfactory material.

In order that the invention may be clearly understood and readily carried into effect, one automatic valve in accordance therewith will now be described, by way of example, with reference to the accompanying drawings, in which.

Figure 1:
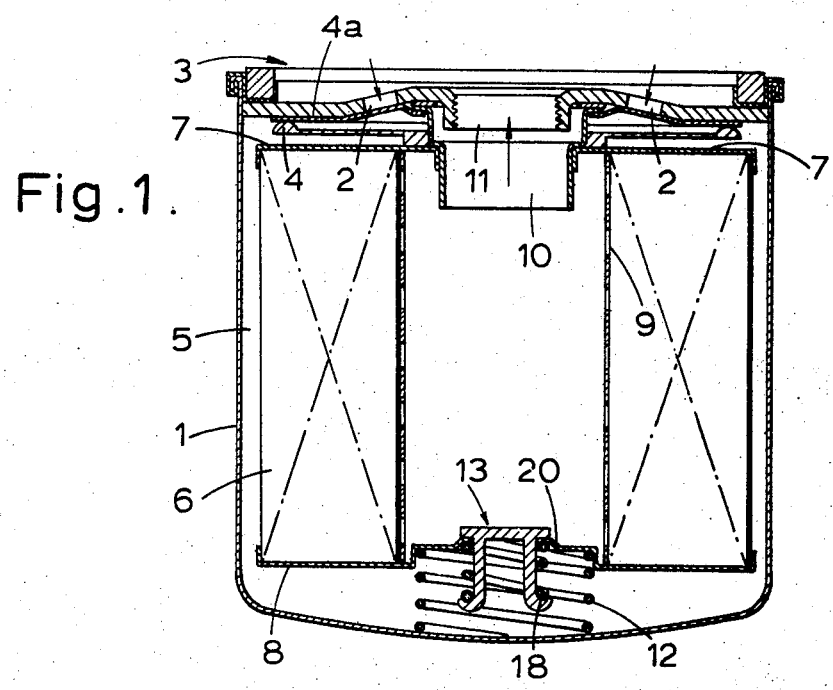
FIG. 1 is a vertical section through a filter assembly containing the valve.
Figure 2:
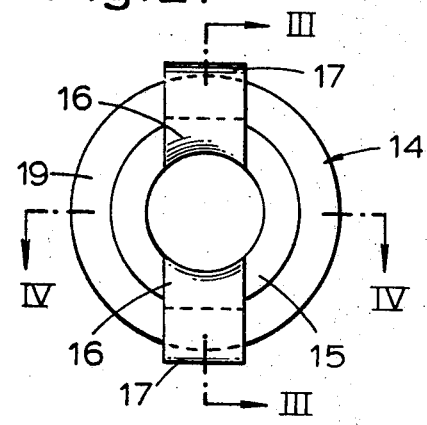
FIG. 2 is a plan of the valve as seen from below on an enlarged scale.
Figure 3:
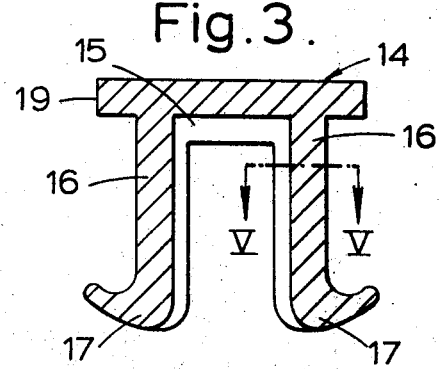
FIG. 3 is a section on the line III—III in FIG. 2.
Figure 4:
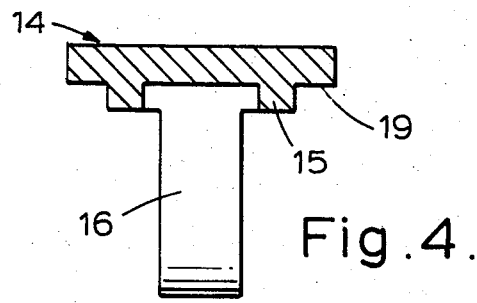
FIG. 4 is a section on the line IV—IV in FIG. 2.
Figure 5:
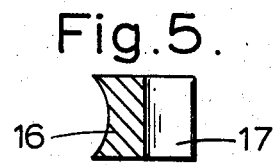
FIG. 5 is a section on the line V—V in FIG. 3.

FIG. 1 is included to show quite precisely one way in which the valve can be used. The filter assembly is for cleaning the oil in an internal combustion engine and includes a casing having an outer bowl 1 into which the oil to be filtered passes through holes 2 in a cover assembly 3. The oil pressure deflects an annular rubber diaphragm seal 4a against the action of a spring 4 as the oil passes to the space 5 between the bowl 1 and the filter comprising a pleated annular paper filter element 6 mounted between end caps 7, 8 and surrounding a perforated tube 9. The cleaned oil, after entering the tube 9, is withdrawn through a duct 10 extending upwards through the centre of the seal 4a the oil then passing through a port 11 in the centre of the cover. A compression spring 12 maintains the cap 7 and duct 10 in position on the cover assembly 3, the duct 10 being an interface fit in an aperture in the cap 7.

If the filter element 6 is allowed to become too dirty or too viscous under cold start conditions to permit oil to pass through the filter element on its way to the outlet port 11, the differential pressure acting on the automatic valve 13 causes it to open to allow oil to pass from the space 5 to the interior of the tube 9 without going through the filter element 6.

Referring to FIGS. 2 to 5, it will be seen that the valve 13 is a poppet or mushroom type valve having a disc shaped head 14 (e.g., 88mm diameter in this particular example) beneath which is formed a shallow annular ring 15 by which the valve, when closed, is centred in a circular port in the centre of the end cap 8. The head provides a peripheral flange 19 and the edge of this port is embossed or raised so as to provide a circular platform 20 against which the peripheral lower face of the head flange 19 bears when the valve is closed.

Extending downwards from diametrically opposite locations on the ring 15 are two limbs 16 with ends 17 that turn outwardly and slightly upwardly to provide hook-like abutments for the lower end of a helical compression spring 18 which normally keeps the valve closed. The top of this spring 18 bears against the embossed edge 20 of the port in the end cap 8.

The valve is moulded in one piece and one suitable material is glass filled nylon. This is a horny material but sufficiently resilient to enable the ends 17 of the limbs 16 to be pressed closely enough together to allow them to pass through the port in the end cap 8, when the valve is being positioned, and to enable them to accept the end of the spring 18.

Figure 6:
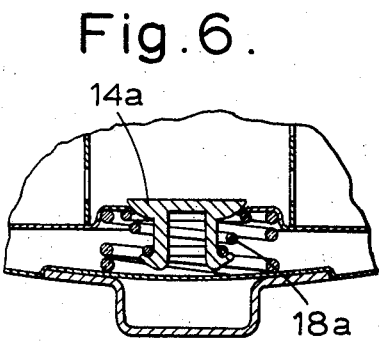
FIG. 6 is a sectional elevation of a modification.

In the modification of FIG. 6, the automatic valve has a head 14a with the lower surface of its flange in sperical form. It is loaded by a spring 18a of conical form, enabling the stem to be made shorter.

I claim:

1. In an oil filter having a tubular casing for generally coaxially receiving a tubular filter element, the casing having a first end provided with an inlet and also with an outlet oriented for communication with the throughbore of the filter element at one end thereof and wall means for ensuring that, except when the pressure behind the oil being filtered required for forcing the oil through the filter element exceeds a predetermined value, for instance because the oil is too viscous or the filter element is too clogged, the oil being filtered must pass radially inwardly through the filter element to transit from the inlet to the outlet, a poppet valve for bypassing oil from the inlet to the outlet, when said value is exceeded, said poppet valve comprising:

annular end wall means received in the casing for disposition at the opposite end of the filter element throughbore to provide a valve seat peripherally of an opening through the annular end wall means;

a poppet having a disk shaped head sized to cover the opening and seal with the valve seat, the poppet further having stem means protruding axially outwardly through the opening and hook means on the stem outwardly beyond the opening; and coil spring means retained between the annular end wall means and the hook means for biasing the poppet toward the seat;

the poppet head, stem means and hook means spreading laterally to a greater width than the diameter of the opening through the annular end wall means; and the poppet being constructed of sufficiently resilient material to permit insertion of the hook means through the opening from the inner side of the annular end wall means in assembling the poppet valve;

the stem means being constituted by a plurality of angularly spaced, axial protrusions, displaced radially outwardly from the center of the head, each protrusion having at least one radially outwardly extending hook of said hook means thereon;

an axially short annular portion of said poppet interposed between the head and the axial protrusions, the annular portion being of such diameter as to fit through the opening, in adjacency with the seat, to aid in centering the poppet upon closure of the valve.

2. The article of claim 1 wherein the annular portion is generally spherically curved.

3. The article of claim 1 wherein the poppet consists essentially of glass fiber-reinforced nylon.

4. The article of claim 1 wherein the axial protrusions are two in number and are angularly spaced by 180° about the longitudinal axis of the poppet.

* * * * *